US012469426B2

(12) United States Patent
Bae et al.

(10) Patent No.: US 12,469,426 B2
(45) Date of Patent: Nov. 11, 2025

(54) SCAN DRIVE CIRCUIT INSENSITIVE TO VARIATIONS IN TRANSISTOR CHARACTERISTICS

(71) Applicant: Hoseo University Academic Cooperation Foundation, Asan-si (KR)

(72) Inventors: Byung-Seong Bae, Suwon-si (KR); Hyuck-Su Lee, Incheon (KR); Seo-Jin Kang, Siheung-si (KR)

(73) Assignee: HOSEO UNIVERSITY ACADEMIC COOPERATION FOUNDATION, Asan-si (KR)

( * ) Notice: Subject to any disclaimer, the term of this patent is extended or adjusted under 35 U.S.C. 154(b) by 0 days.

(21) Appl. No.: 18/628,919

(22) Filed: Apr. 8, 2024

(65) Prior Publication Data

US 2025/0124844 A1 Apr. 17, 2025

Related U.S. Application Data

(63) Continuation of application No. PCT/KR2022/014036, filed on Sep. 20, 2022.

(30) Foreign Application Priority Data

Oct. 6, 2021 (KR) ........................ 10-2021-0132237

(51) Int. Cl.
*G09G 3/20* (2006.01)
*G09G 3/3225* (2016.01)
*G09G 3/3266* (2016.01)

(52) U.S. Cl.
CPC ............. *G09G 3/2092* (2013.01); *G09G 3/20* (2013.01); *G09G 3/3225* (2013.01); *G09G 3/3266* (2013.01); *G09G 2310/0264* (2013.01); *G09G 2310/0267* (2013.01)

(58) Field of Classification Search
CPC ......... G09G 3/2092; G09G 2310/0267; G09G 3/20; G09G 3/3225; G09G 3/3266; G09G 2310/0264
See application file for complete search history.

(56) References Cited

U.S. PATENT DOCUMENTS

2009/0175405 A1* 7/2009 Chen ...................... G11C 19/28 377/68
2012/0098804 A1* 4/2012 Ohhashi ............... G09G 3/3685 377/79
2018/0096645 A1* 4/2018 Lee ...................... G09G 3/2085

* cited by examiner

*Primary Examiner* — Adam J Snyder
(74) *Attorney, Agent, or Firm* — LEX IP MEISTER, PLLC

(57) ABSTRACT

The present invention relates to a scan drive circuit and, more specifically, to a scan drive circuit that is insensitive to changes in the characteristics of transistors, enabling stable operation even when such changes occur within a certain range. Accordingly, the scan drive circuit provides the advantage of high yield when applied not only to conventional rigid substrates but also to flexible or stretchable substrates.
According to the present invention, a scan drive circuit is provided that operates normally regardless of whether the transistor exhibits enhancement-type or depletion-type characteristics, thereby eliminating the need to modify the circuit or employ complex designs based on the characteristics of the transistors.

7 Claims, 5 Drawing Sheets

SCAN DRIVE CIRCUIT INSENSITIVE TO VARIATIONS IN TRANSISTOR CHARACTERISTICS

BACKGROUND OF THE INVENTION

1. Field of the Invention

The present invention relates to a scan drive circuit, and more particularly, to a scan drive circuit which is insensitive to variations in transistor characteristics so that it can operate smoothly even when the transistor characteristics vary within a certain range. Therefore, the scan drive circuit of the present invention has an advantage of high yield when applied to not only a general hard substrate but also a flexible substrate or a stretchable substrate.

2. Description of the Related Art

FIG. 1 is a block diagram illustrating the overall structure of a display and its connected Scan Drive Circuit.

Referring to FIG. 1, the data supplied to the pixel circuit of the display through a latch includes information on brightness. The Scan Drive Circuit performs the function of selecting the line where such data will be written.

Display technology has evolved from bulky and heavy cathode ray tubes (CRTs) to thin and lightweight LCD (liquid crystal display) technology, which has also been adopted for TVs. Following LCD technology, organic light-emitting diode (OLED) technology has been applied to TVs, utilizing oxide transistors. Oxide transistors have the advantage of higher mobility compared to amorphous silicon transistors, but they exhibit depletion-type characteristics, where the transfer characteristics of the transistor shift to the left, causing the transistor to remain in the "on" state even when the gate voltage is zero. When a transistor exhibits depletion-type characteristics, circuits designed for enhancement-type characteristics fail to operate and must be redesigned to accommodate the depletion type. However, such circuits have the disadvantage of requiring more complex configurations.

FIG. 2 illustrates an example of a conventional scan drive circuit 100, and FIG. 3 illustrates the drive waveforms of the scan drive circuit 100 in FIG. 2.

The first transistor T1 operates like a diode, with both its gate electrode and drain electrode connected to the main scan signal (PS). When the PS1 voltage (hereinafter referred to as "V(PS1)") increases in the positive direction, and the difference between V(PS1) and the voltage at point P (hereinafter referred to as "V(P)") exceeds the threshold voltage, i.e., when "V(PS1)−V(P)≥threshold voltage," the first transistor T1 turns on and current flows smoothly, causing V(P) to increase and stabilize.

A capacitor C is connected to point P. When the SS1 voltage connected to the second transistor T2 rises, it is transferred to the source side of T2, causing the voltage at the source to rise. At this time, V(P) increases due to the capacitance effect. When V(P) exceeds V(PS1), the transistor should turn off to block current flow. Only when no current flows, the increased voltage is maintained. This increased voltage further increases the voltage applied to the gate electrode of the second transistor T2, thereby enhancing the current flowing through the second transistor T2 to the scan line (Scan 1).

However, when the transistor has the depletion type characteristic, reverse current flows when V(P) exceeds V(PS1), preventing V(P) from increasing. Consequently, the gate voltage of the second transistor T2 does not increase, causing a problem that the driving capability is not improved.

SUMMARY OF THE INVENTION

The present invention has been devised to solve the above-described problems, and an object of the present invention is to provide a scan drive circuit which operates normally regardless of whether a characteristic of a transistor is an enhancement type or a depletion type, thereby eliminating the need to change a circuit according to the characteristic of the transistor or use a complicated circuit.

In order to solve such problems, there is provided a scan drive circuit comprising: a first thin-film transistor (hereinafter referred to as "the first transistor") configured to send an input signal to a gate electrode of a second thin-film transistor (hereinafter referred to as "the second transistor") when in "on" state; the second transistor configured to output an input signal to an output scan signal line when in "on" state; a third thin-film transistor (hereinafter referred to as "the third transistor") configured to convert a gate voltage of the second transistor into a source voltage of the third transistor when in "on" state; a fourth thin-film transistor (hereinafter referred to as "the fourth transistor") configured to convert a scan output voltage of the output scan signal line into a voltage connected to a source of the fourth transistor when in "on" state; a capacitor for bootstrapping; a main scan signal line configured to apply an on/off control signal to the first transistor; a DC power line connected to a drain electrode of the first transistor; a sub-scan signal line configured to apply, as an input signal, a signal output from the second transistor when the second transistor is in "on" state; a main scan inverted signal line configured to apply an inverted main scan signal, as an on/off control signal for the third transistor and the fourth transistor, to gate electrodes of the third transistor and the fourth transistor; a second input signal line configured to apply an input signal to the fourth transistor; and the output scan signal line configured to output a final scan signal output from the second transistor.

Preferable, the capacitor has one electrode connected to the gate electrode of the second transistor and another electrode connected between the output scan signal line of the second transistor.

The scan driver circuit may further comprise an inverter configured to invert the main scan signal of the main scan signal line, wherein the main scan signal is inverted to "low" when the main scan signal is "high" and inverted to "high" when the main scan signal is "low," and wherein the main scan signal is inverted into the inverted main scan signal through the inverter.

Preferably, a DC voltage applied to the DC power line is higher than a value obtained by subtracting a threshold voltage from a gate voltage of the first transistor.

Preferably, a source electrode of the third transistor is connected to a first input signal line.

Preferably, a source electrode of the third transistor is connected to the output scan signal line.

Preferably, in the case of having a total of t output scan signal lines, the t output scan signal lines are divided into a groups, each consisting of m lines (hereinafter referred to as "main scan signal groups," where a≥1), the main scan signal lines and the main scan inverted signal lines are provided as a pairs, each pair configured to turn on/off the first transistor, second transistor, third transistor, and fourth transistor of a different group among the a main scan signal groups, and wherein the m output scan signal lines of each group are respectively one-to-one matched with different ones of m sub-scan signal lines through m second transistors, and, simultaneously, each of the m output scan signal lines is one-to-one matched with different ones of m second input signal lines through m fourth thin-film transistors.

According to the present invention, there is an effect of providing a scan drive circuit which operates normally regardless of whether a characteristic of the transistor is an enhancement type or a depletion type, thereby eliminating the need to change a circuit according to the characteristic of the transistor or use a complicated circuit.

DETAILED DESCRIPTION OF THE INVENTION

Figure 1:
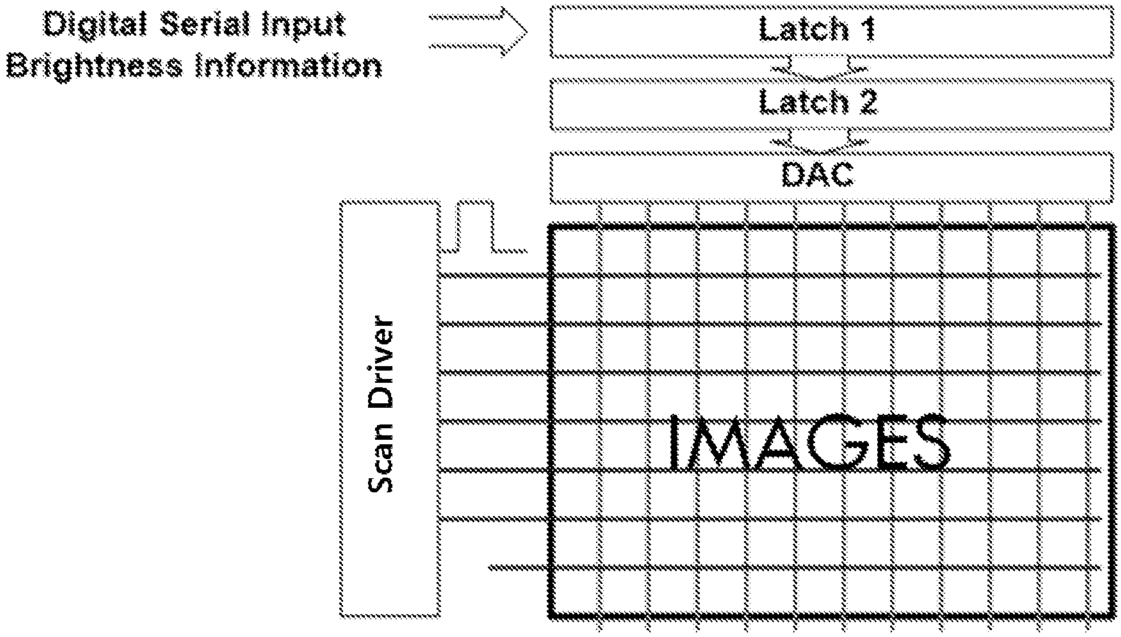
FIG. 1 is a block diagram illustrating an overall structure of a display and a scan drive circuit connected thereto.
Figure 2:
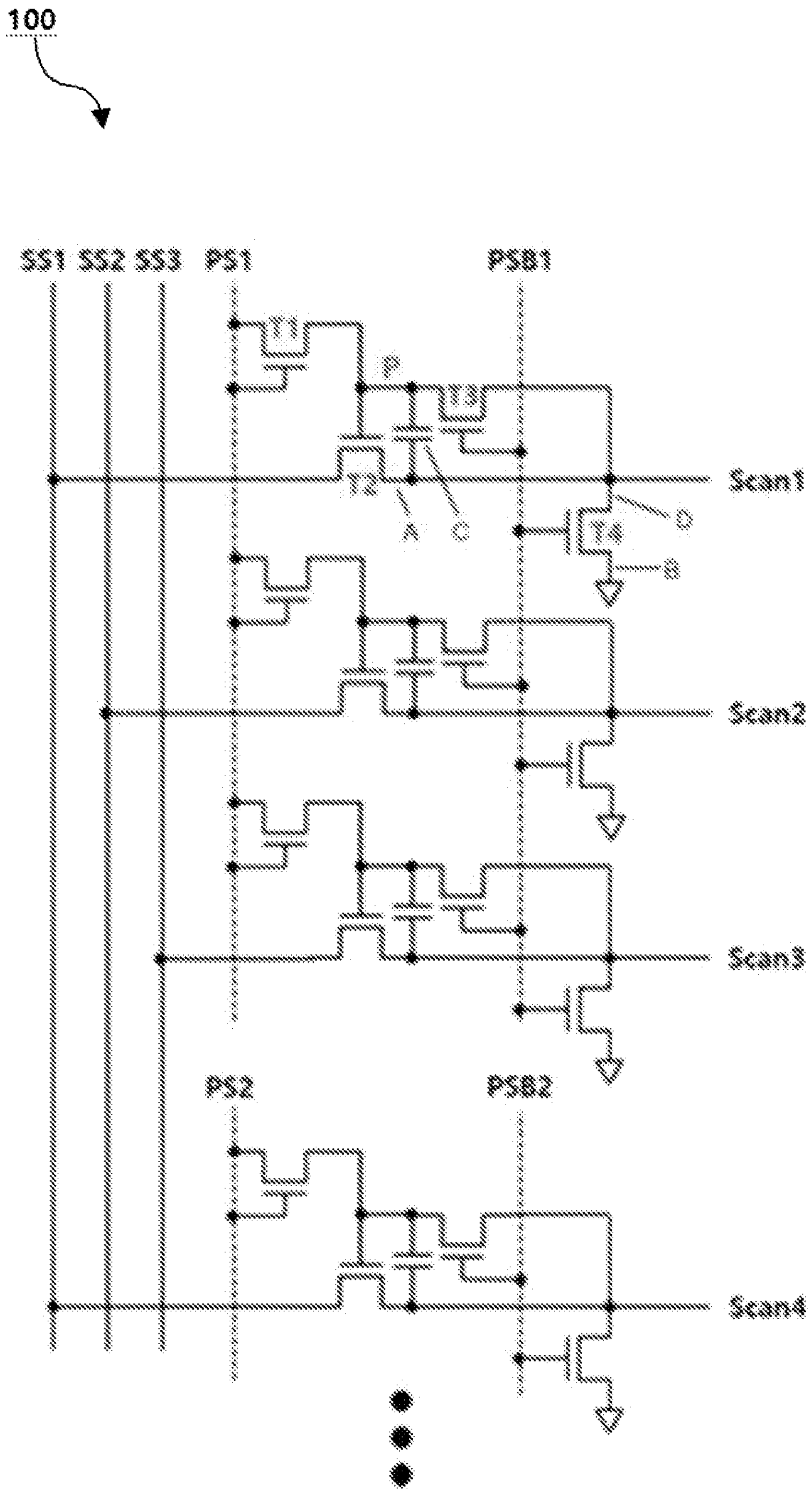
FIG. 2 illustrates an example of a conventional scan drive circuit 100.
Figure 3:
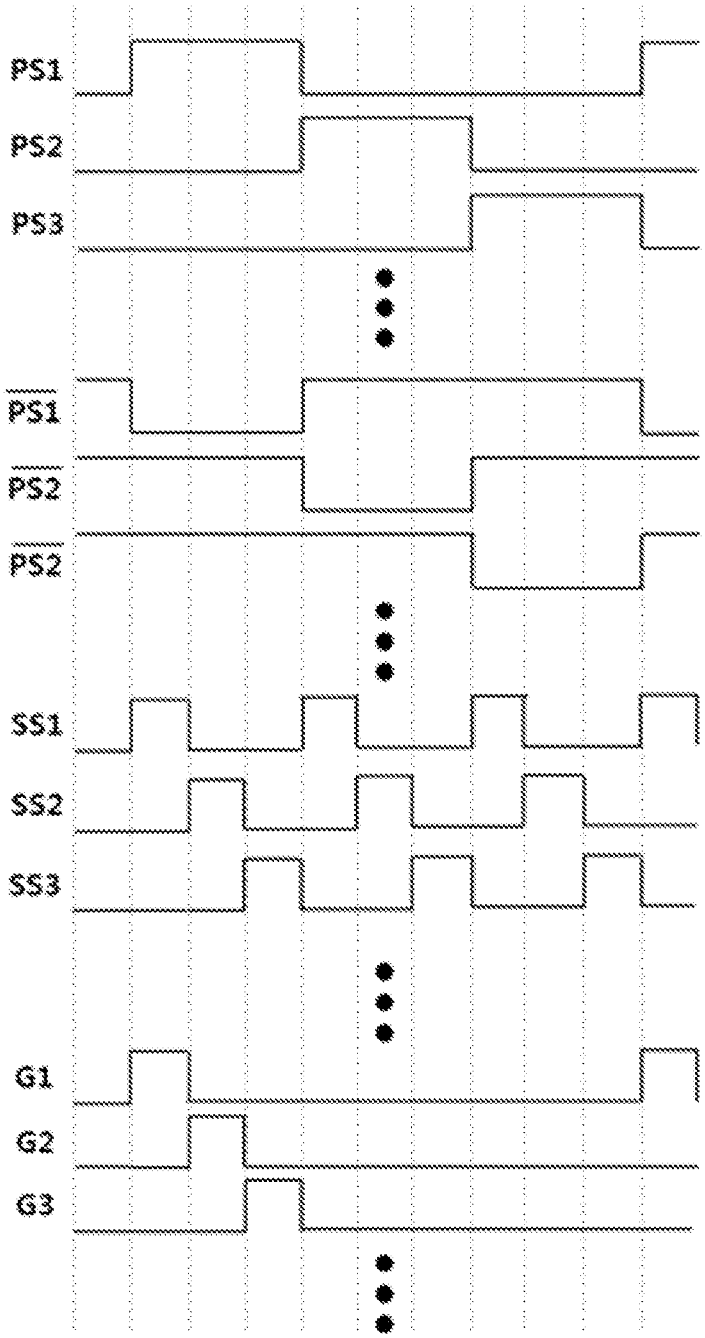
FIG. 3 illustrates drive waveforms of the scan drive circuit of FIG. 2.

Hereinafter, preferred embodiments of the present invention will be described in detail with reference to the accompanying drawings. Before the description, it should be understood that the terms or words used in the specification and claims should not be construed as limited to the usual or lexical meanings, and that the inventor can properly define the concepts of the terms to explain the invention in the best way, and thus the terms or words should be construed in terms of meanings and concepts corresponding to the technical idea of the present invention. Therefore, it should be understood that embodiments and configurations illustrated in the drawings are merely a preferred embodiment of the present invention and do not represent all technical ideas of the present invention, and there may be various equivalents and modified examples for replacing the embodiments and configurations at the time of filing the present application.

Figure 4:
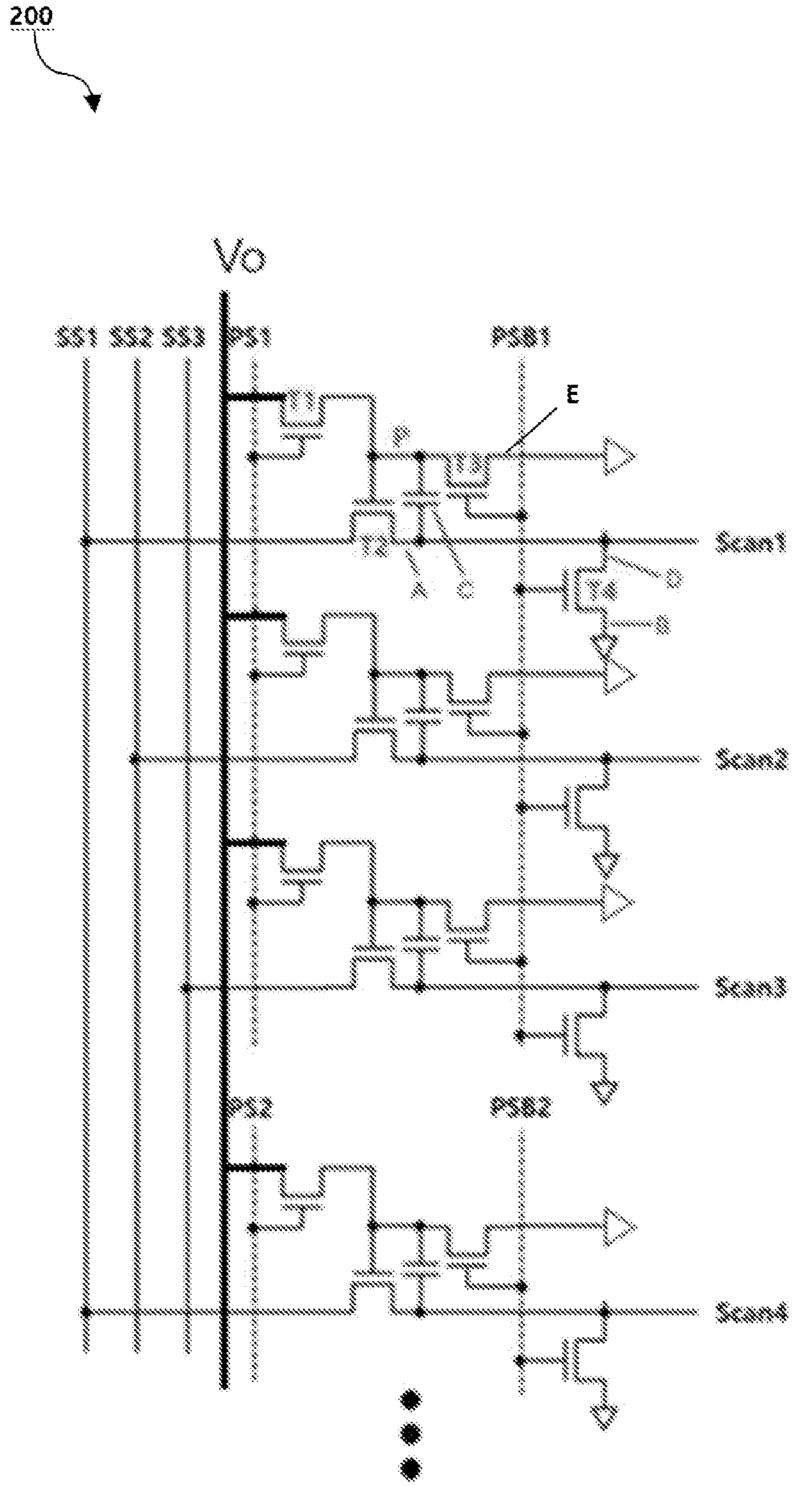
FIG. 4 illustrates a scan drive circuit according to a first embodiment of the present invention.
Figure 5:
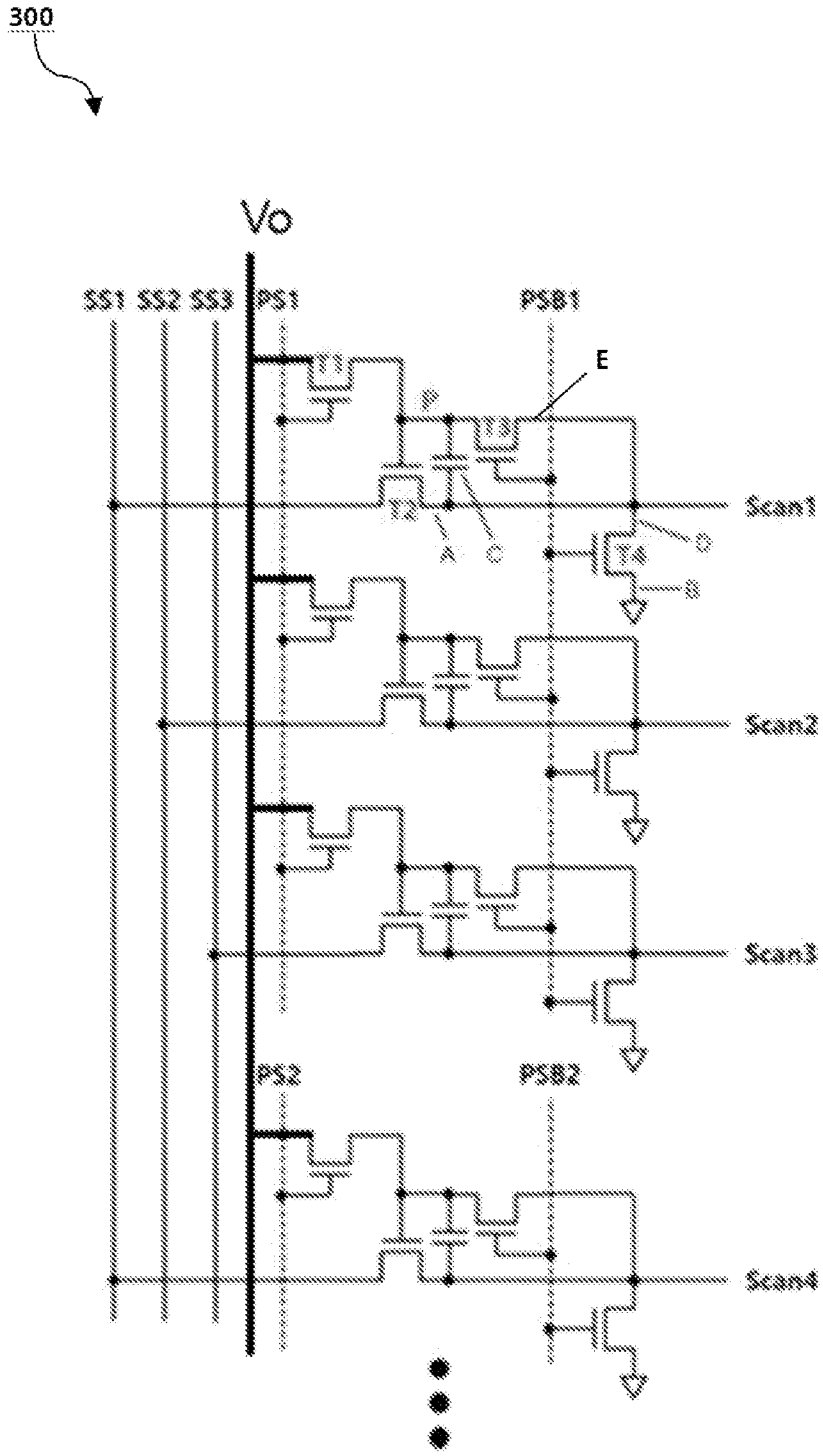
FIG. 5 illustrates a scan drive circuit according to a second embodiment of the present invention.

FIG. 4 illustrates a scan drive circuit 200 according to a first embodiment of the present invention, and FIG. 5 illustrates a scan drive circuit 300 according to a second embodiment of the present invention.

Referring to FIG. 4, the scan drive circuit 200 includes four switching thin film transistors (T1, T2, T3, and T4). Hereinafter, they are referred to as a first transistor, a second transistor, a third transistor, and a fourth transistor, respectively.

Each transistor may be implemented with an n-type MOSFET (Metal Oxide Semiconductor Field Effect Transistor), but is not limited thereto, and may be implemented with a p-type MOSFET.

In general, when the gate electrode and drain electrode of an enhancement type transistor are connected, it can operate like a diode, which is utilized in circuits. However, when the transistor becomes a depletion type, current flows in the reverse direction also, thus it does not operate like a diode, and therefore, the circuit of FIG. 1 does not operate normally.

To improve this, in the scan drive circuit 200 of the present invention as shown in FIG. 4, a signal PS1 (hereinafter referred to as 'main scan signal') for turning on/off the first transistor T1 is connected to the gate electrode of the first transistor T1 through a main scan signal line, and the drain electrode of the first transistor T1 is connected to a separate DC voltage source Vo. In this case, if the DC voltage Vo applied to the drain electrode of the first transistor T1 is higher than the gate voltage minus the threshold voltage, current does not flow through the first transistor T1 when the voltage at point P increases. For example, if the PS1 pulse high voltage is 5V and the threshold voltage of the transistor is −1V, Vo is applied to be higher than 5−(−1)=6V. If the threshold voltage is 1V, Vo is applied to be higher than 5−1=4V.

The operation of the circuit in this case is described as follows:

When the main scan signal PS1 pulse is applied to the gate electrode of the first transistor T1, T1 switches to the "On" state. The voltage Vo connected to the drain electrode of T1 causes the voltage on the source side to increase, thereby raising the voltage at point P. In this state, when the sub-scan signal SS1 pulse is applied, the SS1 pulse voltage is output through the second transistor T2, causing the voltage at point A to rise. At this time, the capacitor C raises the voltage at point P, thereby enhancing the current driving capability of the second transistor T2.

The main scan signal PS1 causes both the first transistor T1 and the second transistor T2 to switch to the "On" state. For instance, when the main scan signal PS1 is "High," the first transistor T1 and the second transistor T2 are "On." Conversely, when the main scan signal PS1 is "Low," both T1 and T2 are in the "Off" state.

When the second transistor T2 is in the "On" state, an input signal (hereinafter referred to as the "sub-scan signal," SS1) applied through the sub-scan signal line passes through T2, and the SS1 value is output as-is via the output signal line of T2 (hereinafter referred to as the "first output signal line," A). The sub-scan signal SS1 is applied in the form of pulses, with a duty ratio of less than 1.

An inverter (not shown) converts the main scan signal, turning it "Low" when the main scan signal PS1 is "High" and "High" when PS1 is "Low." The inverted signal (hereinafter referred to as the "main scan inverted signal," PSB1) is delivered through the main scan inverted signal line as an on/off control signal to the gate electrodes of the third transistor T3 and the fourth transistor T4. Thus, the main scan signal (PS1) and the main scan inverted signal (PSB1) are always in an inverted relationship.

When the fourth transistor T4 is in the "On" state, the voltage on the scan signal line changes to the voltage connected to the source electrode of T4, denoted as point B. This voltage is adjusted according to the threshold voltage of the transistor and provides a voltage capable of turning the transistor off. When T4 is "On," the voltage at source electrode B is supplied as the scan output voltage to the output scan signal line (Scan1). This voltage is delivered to the gate electrodes of the switching transistors in each pixel array connected to Scan1, putting these transistors into the "Off" state. The supplied voltage can be 0 volts, −10 volts, or another value determined by the threshold voltage of the transistors.

The output scan signal line Scan1 is connected to the first output signal line A of the second transistor T2 and the output signal line D (hereinafter referred to as the "second output signal line") of the fourth thin-film transistor.

When the main scan signal is "High" (i.e., the main scan inverted signal is "Low"), the first transistor T1 and the second transistor T2 are in the "On" state, while the third transistor T3 and the fourth transistor T4 are in the "Off"

state. In this state, the sub-scan signal SS1 passes through the second transistor T2 and is applied to the first output signal line A. This signal is then output as the final signal via the output scan signal line Scan1. During this process, the voltage at node P is bootstrapped through the coupling effect of capacitor C, which increases the gate voltage of the second transistor T2, thereby minimizing the loss of the first output signal.

Similarly, when the main scan signal is "Low" (i.e., the main scan inverted signal is "High"), the first transistor T1 and the second transistor T2 are in the "Off" state, while the third transistor T3 and the fourth transistor T4 are in the "On" state. In this condition, the voltage at the second input signal line B passes through the fourth thin-film transistor and is output to the output scan signal line Scan1. This ensures that the voltage of the second input signal line B is output to the output scan signal line Scan1 and prevents Scan1 from entering a floating state during periods when pulses are not supplied.

At this time, the third transistor T3 is turned "On," causing the voltage at node P to change to the voltage of the first input signal line E, which is connected to the input of T3. This transition turns the second transistor T2 "Off."

The scan drive circuit 300 in FIG. 5 modifies the circuit in FIG. 4 by connecting the source electrode of the third transistor T3 to the output scan signal line Scan1.

In FIG. 5, when the main scan signal is "Low" (i.e., the main scan inverted signal is "High"), the first transistor T1 and the second transistor T2 are in the "Off" state, while the third transistor T3 and the fourth transistor T4 are in the "On" state. Under these conditions, the voltage from the second input signal line B passes through the fourth thin-film transistor and is output to the output scan signal line Scan1. Simultaneously, the voltage of the second input signal line B is transferred back to the first input signal line E, which is connected to the output scan signal line Scan1. The first input signal line E is, in turn, connected to the source electrode of the third transistor T3.

Assuming that the voltage of the second input signal line B in the scan drive circuit 200 of FIG. 4 is identical to the voltage at the first input signal line E connected to the source electrode of the third transistor T3, the operation of the scan drive circuit 300 in FIG. 5 is equivalent to that of the scan drive circuit 200 in FIG. 4 as described above.

In FIGS. 4 and 5, the total output signals are represented for convenience as two groups, each using PS1 and PS2 as main scan signals. However, the number of groups can be determined as needed based on the application. Similarly, the sub-scan signals are described as three signals (SS1, SS2, SS3) entering each group, but the number of sub-scan signals can also be adjusted as required.

This general structure can be described as follows: if the circuit comprises a total of t output scan signal lines, these lines are divided into a groups, each containing m lines (hereinafter referred to as "main scan signal groups," where a≥1). Accordingly, a pairs of main scan signal lines and inverted main scan signal lines (e.g., PS1, PSB1; PS2, PSB2; PS3, PSB3; . . . , PSa, PSBa) are provided. Each pair controls the on/off states of the first transistor, second transistor, third transistor, and fourth transistor in one of the a groups.

Within each group, the m output scan signal lines are matched one-to-one with m sub-scan signal lines (e.g., SS1, SS2, SS3, . . . , SSm) via m second transistors T2. Simultaneously, each of the m output scan signal lines is matched one-to-one with m second input signal lines via m fourth thin-film transistors, ensuring precise control and output.

As described above, the scan drive circuit of the present invention minimizes output signal loss even when the characteristics of thin-film transistors or wiring resistance vary in substrates such as conventional materials or stretchable panels. It also prevents the gate potential from floating, providing a reliable circuit configuration. Additionally, the circuit utilizes switching thin-film transistors as its components and incorporates capacitors to perform the function of a scan drive circuit through bootstrapping.

Notably, while conventional scan drive circuits fail to operate when the transistors exhibit depletion-type characteristics, the proposed circuit has the advantage of functioning properly with both depletion-type and enhancement-type transistors.

What is claimed is:

1. A scan drive circuit comprising:

a first thin-film transistor (hereinafter referred to as "the first transistor") configured to send an input signal to a gate electrode of a second thin-film transistor (hereinafter referred to as "the second transistor") when in "on" state;

the second transistor configured to output an input signal to an output scan signal line when in "on" state;

a third thin-film transistor (hereinafter referred to as "the third transistor") configured to convert a gate voltage of the second transistor into a source voltage of the third transistor when in "on" state;

a fourth thin-film transistor (hereinafter referred to as "the fourth transistor") configured to convert a scan output voltage of the output scan signal line into a voltage connected to a source of the fourth transistor when in "on" state;

a capacitor for bootstrapping;

a main scan signal line configured to apply an on/off control signal to the first transistor;

a DC power line connected to a drain electrode of the first transistor;

a sub-scan signal line configured to apply, as an input signal, a signal output from the second transistor when the second transistor is in "on" state;

a main scan inverted signal line configured to apply an inverted main scan signal, as an on/off control signal for the third transistor and the fourth transistor, to gate electrodes of the third transistor and the fourth transistor;

a second input signal line configured to apply an input signal to the fourth transistor; and the output scan signal line configured to output a final scan signal output from the second transistor, wherein the scan drive circuit is configured to:

enable stable operation even when the first transistor is a depletion-type thin-film transistor, by applying a main scan signal via a main scan signal line; and prevent gate floating by controlling gate voltages of the third and fourth transistors through pairs of a main scan signal and an inverted main scan signal, each pair corresponding to a different group of output scan signal lines.

2. The scan drive circuit according to claim 1, wherein the capacitor has one electrode connected to the gate electrode of the second transistor and another electrode connected between the output scan signal line of the second transistor.

3. The scan drive circuit according to claim 1, further comprising an inverter configured to invert the main scan signal of the main scan signal line, wherein the main scan signal is inverted to "low" when the main scan signal is "high" and inverted to "high" when the main scan signal is "low,"

and wherein the main scan signal is inverted into the inverted main scan signal through the inverter.

4. The scan drive circuit according to claim 1, wherein a DC voltage applied to the DC power line is higher than a value obtained by subtracting a threshold voltage from a gate voltage of the first transistor.

5. The scan drive circuit according to claim 1, wherein a source electrode of the third transistor is connected to a first input signal line.

6. The scan drive circuit according to claim 1, wherein a source electrode of the third transistor is connected to the output scan signal line.

7. The scan drive circuit according to claim 1, wherein, in the case of having a total of t output scan signal lines, the t output scan signal lines are divided into a groups, each consisting of m lines (hereinafter referred to as "main scan signal groups," where a ≥1), and wherein the m output scan signal lines of each group are respectively one-to-one matched with different ones of m sub-scan signal lines through m second transistors, and, simultaneously, each of the m output scan signal lines is one-to-one matched with different ones of m second input signal lines through m fourth thin-film transistors.

* * * * *